United States Patent Office 3,804,923
Patented Apr. 16, 1974

3,804,923
THERMOSETTING RESIN, MANUFACTURE AND COMPOSITIONS THEREOF
Hisao Suzuki, Fujisawa, and Akira Musashi, and Tomoyuki Inoue, Ichihara, Japan, assignors to Nippon Soda Co., Ltd., Tokyo, Japan
No Drawing. Filed Apr. 5, 1971, Ser. No. 131,436
Int. Cl. C08d 5/02; C08f 19/08, 15/16
U.S. Cl. 260—879    8 Claims

ABSTRACT OF THE DISCLOSURE

A thermosetting resin having parts of polybutadiene or butadiene copolymer wherein butadiene chain units are 50% or more, preferably 80% or more, of 1,2-configuration butadiene chain units, and CXYH groups and $$CXY \frac{Me}{n}$$

groups wherein X and Y are oxygen atom or sulfur atom and Me is a metal atom of the I group, II group, III group and VIII group in the Periodic and $n$ is valence number of Me; in which weight of the parts of polybutadiene copolymer is more than 70% of the weight of non metallic parts, and total weight of CXY groups is 0.1% to 30%, preferably 1% to 15% of the non metallic parts the numeral ratio of CXYH to $$CXY \frac{Me}{n}$$

equals to 2 or more.

DETAILED EXPLANATION OF THE INVENTION

This invention relates to a novel curable resin and to the compositions thereof and more particularly is concerned with a novel curable resin characterized by having a 1,2-configuration in the butadiene chain as a main chain, metallo carboxylate groups which make soaps and combine with the polybutadiene chain. This invention also relates to the process for the production of the aforementioned resin.

It is well known that the linear polymer of copolymer of butadiene having a molecular weight of 500–20,000 is cured under heating together with a organic peroxide compound to produce a thermosetting resin, a coating film and an adhesive. However, in order to gain a sufficiently cured product, a high temperature and a long period of time, for example 200° C. or higher for from several hours to a day or longer are required. Thus, low efficiency of a baking apparatus, or difficulty of mass-production, results in a high cost of the cured product.

Some olefinic polymers, which are elongated by metallo carboxylate linkages between metallic ions and carboxyl groups (COOH) belonging to the polymer chain, are reported in U.S. Pats. 2,626,248, 2,662,874, 2,669,550, 2,710,292, 2,726,230, 2,724,707, 2,849,426. However those resin posses low strength, low chemical resistance and low electric insulate properties in high temperature and it takes a long period of time to be cured because those resins have low reactivities in the polymer chain.

Unsaturated polyester which are elongated metallo carboxylate linkages between metallic ions and carboxyl groups (COOH) in the polyester chain are reported in U.S. Pats. 3,431,320 and 3,465,061. However these resin posses inferior properties of chemical resistance, electrical insulating properties and thermal properties.

Accordingly, it is the object of this invention to overcome the aforementioned problems and disadvantages.

It is another object of this invention to provide a new thermosetting resin having a high mechanical strength, high chemical resistance, good adhesiveness with filler and reinforcement and excellent electrical insulation.

It is another object to provide a new thermosetting resin which can be obtained from sticky elastomer to fine powder, cures quickly and is well suited for adhesives, coating material, moulding material and impregnated material for reinforced plastics such as prepregs for sheet moulding compound and laminate moulding compounds.

It is another object to provide a method for the preparation of the thermosetting resin which can be easily mixed and can be made from cheaper raw materials.

Other objects and advantages of this invention will become apparent hereinafter.

In general, when butadiene is polymerized itself or with another comonomer, 1,3-butadiene can enter into a polymer chain by either 1,2- or 1,4-mode of addition; the 1,2-mode of addition results in the following "pendant vinyl" structure $$\left[ \begin{array}{c} -CH_2-CH- \\ | \\ CH \\ \parallel \\ CH_2 \end{array} \right]$$

(hereinafter called "1,2-configuration butadiene chain unit") whereas 1,4-mode of addition results in the following structure:

$$-(CH_2-CH=CH-CH_2)-$$

The mode of addition depends on the type of catalysts and conditions used for the polymerization. As the unsaturated bond in the pendant vinyl structure shows high activity in comparison with internal olefinic structure, polybutadiene having a high content of 1,2-configuration butadiene units gives a hard polymer within a relatively short period of time.

We have discovered a thermosetting resin having parts of polybutadiene or butadiene copolymer wherein the butadiene chain units are 50% or more, preferably 80% or more, of 1,2-configuration butadiene chain units, and CXYH groups and $$CXY \frac{eM}{n}$$

groups wherein X and Y are oxygen atom or sulfur atom and Me is a metal atom of the I group, II group, III group and VIII group in the Periodic Table and $n$ is the valence number of Me; in which weight of the parts of polybutadiene or butadiene copolymer is more than 70% of the weight of non metallic parts and total weight of CXY groups is 0.1% to 30% more preferably 1% to 15% of the non metallic parts.

In the invention when X and Y are oxygen at the same time, CXYH shows carboxyl group (COOH) and when X and Y are sulfur, dithio carboxyl group (CSSH) are shown and further either X or Y is oxygen and the other is sulfur, thiocarboxyl groups (CO:SH or CSOH) are shown.

When polyvalent metals are used in the resin of this invention, the thermosetting resin may have linkage structures, for example, in case that Me is a bivalent or a polyvalent metal and X or Y are the oxygen atom, the resin has metallo carboxylate linkages $$\begin{array}{cc} O & O \\ \parallel & \parallel \\ (polymer-C-O-Me-O-C-polymer) \end{array}$$

and linear or three-dimensional structure. The resin having metallo carboxyl has a characteristic absorption peak of an infrared absorption spectrum at about 1600 cm.$^{-1}$ depending on the carboxylate groups and weak absorption at 1700 cm.$^{-1}$ depending on the carboxyl groups in spite of the fact that polycarboxyl 1,2-polybutadiene used as a raw material has no absorption at about 1600⁻¹.

Metals in the resin of this invention make a weak ionic crossbond in the form of metallo-carboxylate

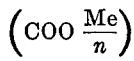

metallo-thiocarboxylate

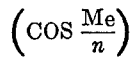

or metallo dithiocarboxylate

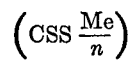

because the resin shows equivalent fluidities to ones which polycarboxyl 1,2-polybutadiene used as a raw material shows under moulding conditions.

In this invention the new thermosetting resin can be most preferably prepared by mixing A and B; wherein A is a polymer (hereinafter merely called a "polycarboxyl 1,2-polybutadiene") having parts of polybutadiene or butadiene copolymer wherein the butadiene chain units hold more than 70% of A and the butadiene chain units are 50% or more, more preferably 80% or more, of 1,2-configuration butadiene chain, and CXYH groups wherein X and Y are oxygen or sulfur atom and the total weight of the CXY groups is 0.1% to 30% more preferably 1% to 15% of A; and B is a metal, metal hydroxide, metal oxide, metal alkolate or metal salt wherein the metal or metal cation is a metal or cation of I group, the II group, III group or VIII group in the Periodic Table and the salt is an organic or inorganic salt.

The reaction can be carried out by mixing at room temperature to 200° C. for 1 minute to 5 hours in the presence or absence of a polar organic solvent or water and if desired filler, radical reaction initiator (hereinafter called as "radical initiator") as curing catalyst for cross-linking or other additives is previously added before the reaction.

The reaction mixtures containing the new thermosetting resin can be obtained in the state of liquid to solid of powder according to desired purposes.

When the thermosetting resin is used for many purposes such as coating materials, adhesives, laminate materials, moulding materials, the resin is ordinarily cured in the presence of radical initiator for cross-linking of butadiene chains at temperatures of about 120 to 180° C. for 1 to 30 minutes, if desired, under a pressure of 5 to 30 kg./cm.².

For example, the "polycarboxyl 1,2-polybutadiene" as a raw material of the thermosetting resin is dissolved into an organic solvent, e.g. toluene, xylene, acetone, tetrahydrofuran or mixture thereof and necessary amounts of metal components are added into the solution, if desired a small amount of water is added into the solution. The solution is allowed to react at about room temperature to a reflux temperature for 30 minutes to 5 hours. After the reaction, 0.5 to 10 parts of organic peroxides as a radical initiator, preferably 1 to 5 parts of them are homogeneously mixed with 100 parts of the total amount of "polycarboxyl 1,2 - polybutadiene" if desired, polymerization inhibitor, surface treatment, agents such as silane coupling agents, vinyl monomer, colorants or fillers can be added besides.

Moreover, the reaction can be carried out in the state of emulsion and in that case the "polycarboxyl 1,2-polybutadiene" is emulsified in water and reaction proceeds in accordance with the case that an organic solvent is employed.

The homogeneous mixture containing the thermosetting resin of this invention can be used as a coating material and adhesives and for impregnation of prepregs for reinforced plastics. In the later case, preferable reinforcements may be cloth or mats made with inorganic materials such as glass fiber and asbestos, organic materials such as synthetic fiber e.g. nylon, polypropylene. After drying up the organic solvent at room temperature to 130° C. preferably under reduced pressure, the surfaces of the prepregs in this invention are tack free. The coating material, adhesives and prepregs are cured by heating or heating under pressure.

Moulding compound can be obtained by means that the filler impregnated the homogeneous mixture are dried up under reduced pressure and then the filler is ground into powder or granules.

More preferably a moulding compound can also be obtained by means of 100 parts of "polycarboxyl 1,2-polybutadiene" and 0.5 to 10 parts preferably 1 to 5 parts of a initiator such as organic peroxides, if desired some amounts or antioxidant, surface treatment agent, colorant, moulding lubricant, vinyl monomer and other additives are well mixed and then 80 to 90% of the total amount of intended filler is mixed with a mixture obtained in the preceding step and the mixture of slurry or dough is obtained and on the other hand 20 to 10% of intended filler and metal component which is in enough of a quantity to react with more than 50% of CXYH groups of the "polycarboxyl 1,2-polybutadiene" are mixed. Then, the slurry or dough containing "polycarboxylic 1,2-polybutadiene" and the mixture of metal component are kneaded at temperatures of about 70 to 80° C. for 10 to 60 minutes to produce grain or dough material. When they are cooled in a room temperature, then are solidified into brittle substance and become easy to be ground into fine powder to granule of a moulding composition.

When polycarboxyl 1,2-polybutadiene having a number average molecular weight of less than 200 is used, the thermosetting resin deteriorates in electrical property, water resistance and chemical resistance and when "polycarboxyl 1,2-polybutadiene" having a number average molecular more than 20,000 is used, the thermosetting resin is inferior in working property. Moreover if "polycarboxyl 1,2 - polybutadiene" having 1,2-configuration butadiene units less than 50% in total polybutadiene or butadiene copolymer is used, the thermosetting resin requires a long time to be cured and have inferior mechanical properties and if the CXYH groups are less than 0.1% or more than 30% in "polycarboxyl 1,2-polybutadiene," the resin become sticky or inferior in electric properties and narrow molecular weight distribution of $$\frac{\overline{M}_w}{\overline{M}_n}$$

of 1.0–1.5 makes the resin void free.

"Polycarboxyl 1,2-polybutadiene" employed as a raw material in this invention has many variations and can be prepared by known methods or according to similar known methods.

Following are the typical examples of the preparation.

In general, polybutadiene having a high content of 1,2-configuration butadiene units can be prepared by various methods, for example, butadiene homopolymer is produced by polymerization of the butadiene monomer using such catalysts as alkali metal catalyst in hydrocarbon solvent, lithium or an organnolithium compound catalyst in hydrocarbon a solvent or a Lewis base solvent, coordinated anion catalysts, Lewis base compound i.e., tetrahydrofuran and alkali metal catalyst for anionic-living polymerization in the presence or absence of aromatic hydrocarbons activator. When less than about 30% of the butadiene monomer is employed in the above polymerization is replaced by another comonomer having active vinyl groups such as styrene, α-methyl styrene, isoprene, methyl acrylate, ethylacrylate, methyl methacrylate, ethyl methacrylate and methyl thioacrylate, ethyl thioacrylate, and methyl dithioacrylate, ethyl dithioacrylate, methyl dithiomethacrylate, ethyl dithiomethacrylate, butadiene copolymer having more than 70% of butadiene molecular chain units can be used.

In order to obtain "polycarboxyl 1,2-polybutadiene" by introducing CXYH groups into the butadiene polymer or butadiene copolymer, pendant vinyl groups and tertiary carbon atoms owing to the 1,2-configuration of butadiene units are used as functional groups for carboxylation thiocarboxylation or dithiocarboxylation and further in the case that the butadiene polymer or butadiene copolymer has other functional groups in the course of the polymerization process or after the perfection of the polymerization, carboxylation, thiocarboxylation or dithiocarboxylation can be carried out by using the functional groups such as living terminals in anionic-living polymerization, hydroxyl groups (—OH), mercapto groups (—SH), amino groups (—NH₂), epoxy groups

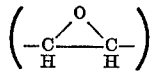

chlorocarbonyl groups (—COCl), cyano groups (—CN) and alkoxy carbonyl groups

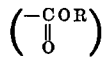

For example, polybutadiene or butadiene copolymer polymerized in anionic living polymerization and having living-terminals is allowed to react with carbondioxide (CO₂), carbon disulfide (CS₂) carbonyl sulfide (COS), carboxylic acid anhydrides dithiocarboxylic acid anhydride and thiocarboxylic acid anhydride, such as maleic anhydride and its derivatives e.g. chloromaleic anhydride, 1,2-diethylmaleic acid anhydride, citraconic acid anhydride, phthalic anhydride and its derivatives e.g. tetrachloro phthalic anhydride, hexahydrophthalic anhydride and these corresponding dithiocarboxylic acid under 0° C. to —90° C. and then, the reaction mixture is treated with water and neutralized.

Thus, "polycarboxyl 1,2-polybutadiene" having corresponding carboxyl groups, dithiocarboxyl groups or thiocarboxyl groups in each molecular edges is easily obtained.

Further, pendant vinyl groups can be reacted with compound having CXYH group and mercapto groups such as thioglycollic acid and carboxyl groups can be introduced in the butadiene polymer or butadiene copolymer.

Hydroxy groups and mercapto groups can be esterified by reacting saturated or unsaturated polycarboxylic acid, polythiocarboxylic acid, polydithiocarboxylic acid and anhydrides thereof, such as maleic acid, maleic acid anhydride, chloromaleic acid, chloromaleic acid anhydride, citraconic acid, citraconic acid anhydride, 1,2-diethyl maleic acid 1,2-diethyl maleic anhydride phthalic acid, phthlic acid anhydride, tetrachloro phthalic acid, tetrachloro phthalic anhydride, tetrahydrophthalic acid, tetrahydroxy phthalic anhydride, fumaric acid, isophthalic acid, terephthalic acid, trimellitic acid, pyromellic acid, malonic acid, oxalic acid, succinic acid, glutaric acid, adipic acid, pimeric acid, suberic acid, azelaic acid, sebacic acid, trimellitic acid and trimellitic acid anhydride, and corresponding dithiocarboxylic acid and thiocarboxylic acid thereof, more than 1,5 equivalent for 1 equivalent of hydroxyl groups or mercapto groups for 5 minutes to 3 hours at room temperature to reflux temperature in an absence or presence of catalyst of acids and diluents.

Amino groups are reacted with organic di-acid anhydrides such as maleic acid anhydride, citric anhydride, phthalic acid anhydride, trimellitic acid anhydride and their derivatives such as chloromaleic acid anhydride, 1,2-dimethyl muleic acid anhydride, tetrahydrophthalic acid anhydride in the presence or absence of diluent, at elevated temperature of about 70° C. to 200° C. for 5 minutes to 10 hours.

Epoxy groups are reacted with carboxylic acid anhydrides or thiocarboxylic acid anhydride dithiocarboxylic acid anhydride in the presence of water, and with dicarboxylic acids or hydroxy acids such as maleic acid anhydride, chloromaleic acid anhdride, citraconic acid anhyride 1,2-dimethyl maleic acid anhydride, phthalic acid anhydride, trimelic acid anhydride glycolic acid, hydroxy butyric acid, cresotic acid salicyclic acid, hydroxy benzoic acid, lactic acid, hydroacrylic acid, glyceric acid malic acid, tertaric acid, citric acid, gallic acid, mandelic acid and amino acid such as glycine, alanine aminobutyric acid, and these corresponding thiocarboxylic acid and dithiocarboxylic acid. The reaction can be carried out stoichiometrically at temperatures ranging from room temperature to 200° C. for 30 minutes to 10 hours in the presence of a diluent and if desired, catalyst of a base such as potassium hydroxide, sodium hydroxide tertiary amines are employed.

Tertiary carbon atom and pendant vinyl groups are reacted by a grafting reaction with carboxylic thiocarboxylic or dithiocarboxylic acids and half esters of diacids having vinyl groups such as thiomethacrylic acid, dithiomethacrylic acid, methacrylic acid thioacrylic acid, dithioacrylic acid, acrylic acid and half ester of maleic acid, maleic acid, maleic acid anhydride, chloromaleic acid and anhydride thereof, fumaric acid, chloro maleic acid. these corresponding thiocarboxylic acid, dithiocarboxylic acids, dithiocarboxylic acid anhdyrides and thiocarboxylic acid anhydride and CXYH groups are introduced in butadiene copolymer or polybutadiene. The reaction can be carried out in the presence of catalyst of radical initiators at the decomposition temperature of the radical initiator if desired organic solvent are employed and the temperature should be elevated from 150° C. to 250° C. in the absence of radical initiator under inert gas such N₂.

Chlorocarbonyl groups are treated with water and the reaction proceeds vigorously and gives carboxylic acid.

Cyano groups are hydrolyzed and easily converted to carboxyl groups by reacting with water in the presence of a base catalyst such a potassium hydroxide, sodium hydroxide at 50° C. to 150° C., for 30 minutes to 5 hours.

When the butadiene copolymer has ester groups of carboxylate dithiocarboxylate or thiocarboxylate groups by copolymerization of butadiene and such comonomer having vinyl groups and alkoxycarbonyl groups as methyl acrylate, ethylacrylate, methylmethacrylate ethylmethacrylate and methyl thioacrylate, ethylthioacrylate, methyl thiomethacrylate, ethyl thiomethacrylate and dithiocarbonylate and thiocarboxylate thereof, or butadiene copolymer or the polybutadiene has ester groups by grafting as above said esters or the half ester thereof, the ester can be easily hydrolyzed into carboxyl groups, thiocarboxyl groups or dithiocarboxyl groups in the presence of water at room temperature to 150° C. with alkali base catalysts.

In order to introduce such functional groups, in the butadiene copolymer or polybutadiene as hydroxyl groups, mercapto groups, amino groups and epoxy groups which are suitable to introduce CXYH groups, pendant vinyl groups are well suited for the purposes.

For example, hydroxyl groups can be introduced in a Prince reaction by heating polybutadiene or butadiene copolymer in the presence of sulfuric acid or glacial acetic acid and formaldehyde with solvents at temperature of 5° C. to 150° C. Mercapto groups can be introduced by reacting a polybutadiene or butadiene polymer with compounds having two mercapto groups such as thioglycol (HSCH₂CH₂SH), dithiohydroquinon

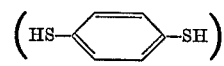

under the condition of irradiation with U.V. rays or in the presence of a catalyst of peroxide upon heating at a temperature of 50° C. to 150° C.

Amino groups can be introduced by reacting ethyleneamine and acrylamide.

Epoxy groups can be introduced by treating the polybutadiene or butadiene copolymer with hydrogen peroxide, acetic acid and sulfuric acid and with peracids such as perbenzoic acid, peracetic acid at room temperature to 100° C. for 30 minutes to 7 hours.

When the polybutadiene or butadiene copolymer is prepared by anionic-living polymerization, the polymer has living terminals in the molecular edges in the course of the polymerization and the living terminals are employed preferably just after the polymerization to introduce functional groups such as hydroxyl groups, mercapto groups, amino groups, cyano groups, chlorocarbonyl groups, which can be employed to introduce CXYH groups.

The reaction proceeds substantially stoichiometrically at 0° C. to −75° C., for example, hydroxyl groups can be derived by reacting the living terminals with epoxide such as ethyleneoxide, propyleneoxide, glycidal

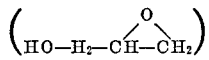

aldehydes such as aceto aldehyde, formaldehyde and ketons such as aceton, methyl ethyl keton. Mercapto groups can be derived by reacting ethylenesulfide

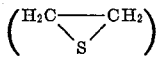

or sulfur. Amino groups are introduced by ethylene imine

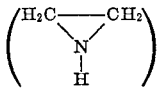

amino acid ester such as p-alkoxy carbonyl aniline

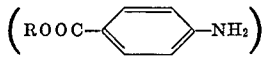

and hologenated aniline such as bromo aniline

Cyano groups can be introduced by reacting chlorocyan (ClCN). Chloro carbonyl groups can be introduced by reacting phosgene (COCl₂) and epoxy groups can be introduced by epichlorohydrin.

Hydroxyl groups can be introduced by hydrolysis of the acetate bond (—C—OCOCH₃) which are introduced by copolymerization of vinyl acetate and butadiene by means of selecting vinyl acetate as the comonomer in the preparation of butadiene copolymer.

As the above various routes can be employed in the invention to introduce CXYH groups in polybutadiene or butadiene copolymer. However shorter routes are, as a matter of course, preferred to obtain desired "polycarboxyl 1,2-polybutadiene."

The most convenient way to obtain the desired "polycarboxyl 1,2-polybutadiene" is by anionic-living polymerization of butadiene, if desired, with comonomer. Because, in the polymerization of the butadiene polymer a high content of 1,2-configuration butadiene units more than 80% and a narrow molecular weight distribution

of 1.0–1.5 is easily obtained and polybutadiene or butadiene polymer having living terminals which are convenient to introduce CXYH groups can be obtained in the course of the preparation. Typical anionic-living polymerization is as follows;

Butadiene is added into a polar organic solvent such as tetrahydrofuran, 1,4-dioxane, aliphatic poly ethers, containing a di-phenyl benzene, naphthalene at 0° C. to −90° C. preferably −40° C. to −80° C. and butadiene polymer having a high content of 1,2-configuration butadiene units more than 50% preferably more than 80% and a narrow molecular weight distribution

of 1.0–1.5 can be obtained.

($\overline{M}_w$ represents a weight average molecular weight and $\overline{M}_m$ is a number average molecular weight)

Molecular weight can be freely controlled in about 200 to 20,000 by changing the feed amounts of butadiene. If desired an adequate amount of comonomer can be polymerized with the butadiene and butadiene copolymer having a residual comonomer chain unit at a desired molecular weight ratio.

As metal components for the present invention ones which supply $Id^+$, $Na^+$, $K^+$, $Cs^+$, $Cu^+$, $Ag^+$, $Hg^+$, $Be^{++}$, $Mg^{++}$, $Ca^{++}$, $Sr^{++}$, $Ba^{++}$, $Zn^{++}$, $Cd^{++}$, $Hg^{++}$, $Pb^{++}$, $Fe^{++}$, $Co^{++}$, $Ni^{++}$, $Al^{+++}$, $Sc^{+++}$, $Y^{+++}$, $Fe^{+++}$ and $Ti^{++++}$ can be employed and metal component which makes by-products being easy to remove from the resin in the reaction of CXYH groups and the metal components are preferably used. Metals of the I, II, III and VIII groups in the Periodic Table may be used in the state of metal chlorides, hydroxides, oxides, alkolates and salts. Salts of organic acid such as formic acid, acetic acid, propionic acid, butiric acid, maleic acid, succinic acid, maleic acid and furmaric acid, salts such as acylcarbamide acylcarbomate

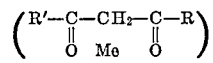

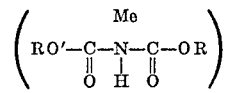

β-diketon

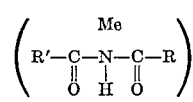

substituted or unsubstituted benzenesulfonamide and corresponding dithiocarboxylic acid and thiocarboxylic acid thereof and inorganic acid salts such as chlorides, bicarbonates, carbonates, phosphates, phosphites, sulfates, sulfites, bisulfates, bisulfites preferably formates, acetates, carbonates, bicarbonates, sulfites, bisulfates, can be used and oxides of metal in the II group, alkolates of metal in the I, II and III groups and hydroxides in the I and II groups are preferably used. Particularly Mg, Ca and Zn an oxides, hydroxides and acetates thereof are most preferably employed.

When the reaction is too rapid to mix the metal component and polybutadiene polymer, acid anhydrides are used with the metal component because acid anhydrides make the reaction of CXYH groups and metal component mild and lengthen the reaction period.

The quantity of metallic component employed in our invention changes depending on the purpose of the finished resin, molecular weight of "polycarboxyl 1,2-polybutadiene" used as raw material, the number of CXYH groups in the polymer and the locations of CXYH groups in the "polycarboxyl 1,2-polybutadiene," however metallic compound in quantities which are sufficient to react with at least 30% to 35% of (CXYH) groups in the polycarboxyl 1,2-polybutadiene are required.

Organic peroxide compounds for radical initiators, which may be employed with the thermosetting resin composition include: diacylperoxides, e.g. benzoyl peroxide, 2,4-dichlorobenzoyl peroxide, octanoyl peroxide, lauroyl peroxide; dialkyl peroxides, e.g. di-tert-butyl peroxide, dicumyl peroxide; alkyl peresters, e.g. tert-butyl perbenzoate, tert-butyl peracetate, di-tert-butyl perphthalate, 2,5-dimethyl 2,5-di(benzoyl peroxy)hexane; ketone peroxides, e.g. methyl ethyl ketone peroxide, cyclohexanone peroxide; and hydroperoxides, e.g. tert-butyl hydroperoxide, cumen hydroperoxide, α-phenyl ethyl hydroperoxide, cyclohexenyl hydroperoxide.

Curing promotors of this composition include amines, e.g. dimethylaniline, diethylaniline and metal salts between carboxylic acids e.g. octyl acid, stearic acid, oleic acid, linoleic acid, naphthenic acid and rosin acid and metals which are selected from the group consisting of chromium, iron, cobalt, nickel, manganese and lead have effect for wiring promoter.

When amines are used as curing promotors 0.1 to 5 parts of the amines are used in composition per 100 parts of thermosetting resin and in case of the metal salts, an amount of the salts corresponding to 0.001 to 1 part of metal are preferably used per 100 parts of thermosetting resin. Typical fillers are powder or particles of polyethylene, polybutadiene rubber, wooden dust, cellulose, plasticizer, talc, kaoline, asbestos, silica, glass fiber mica, alumina, aluminum hydroxide, calcium carbonate iron, aluminum, and copper and 50 to 700 parts of fillers are preferably used per 100 parts of the thermosetting resin.

As reinforcing materials paper, cotton cloth, glass fiber, choped glass synthetic fiber such as nylon and polypropylene, asbestos, wire or gauze of iron, aluminum and copper may be employed and 2 to 100 parts of such reinforcing materials are preferably employing for moulding or laminate products and glass fiber treated with surface treatment agents is most preferably employed for laminate products with good electrical and mechanical properties and heat resistance properties.

Anthioxidants, which are preferably used for the thermosetting resin, include; alkylphenols, imidazoles, quinones, allylamines and they are used in the quantity of 0.01 part preferably 0.1 to 5 per 100 parts of the thermosetting resin and as a internal moulding releasing agents, 0.1 to 2 parts of stearates of aluminum, magnesium, zinc, calcium and barium are preferably employed for 100 parts of moulding composition.

A composition for moulding compounds for use as pottings, castings, sheet moulding compounds, bulk moulding compounds contains 20 to 98% of the thermosetting resin of our invention, 0 to 70% of vinyl monomer, 0.1 to 10% of radical initiator, 0.001 to 1% of a curing promotor and the balance of other kinds of thermosetting resins and fillers if desired and the thermosetting resin used in the composition is preferably made of "polycarboxyl 1,2-polybutadiene" having an average number molecular weight of 500 to 5,000 and favorably more than 80% of 1,2-configuration.

The resin is curable at relatively lower temperature within a short period of time such as 120° C. 10 minutes or 150° C., 5 minutes and therefore it is particularly favorable among the resin of the invention.

Vinyl monomers which may be employed the thermosetting resin composition include styrene, α-methylstyrene, t-butylstyrene chlorostyrene vinyl toluene propylacrylate, ethylacrylate, methylacrylate, propyl methacrylate ethyl methacrylate, methyl methacrylate, diethyl fumarate, dimethyl fumarate, diethyl maleate, dimethyl maleate and diallyl phthalate and they are selected depending on usage of the cured resin. For examples, if mechanical strength is required, aromatic vinyl compounds, acrylates or methacrylates are employed, if electrical properties are important, aromatic vinyl compounds are employed and if rapid curing is necessary, acrylates or methacrylates are used.

Furthermore, as one of the embodiments of this invention, unless it is contrary to the expected object, other polymer may be added to the thermosetting resin composition and one of examples of the other polymer is unsaturated polyester or alkyd resin.

A composition for the coating material comprises 10 to 95% of the resin of this invention, 0.1 to 10% of a radical initiator, 0.001 to 1.0% of a curing promoter, an adequate quantity of an organic solvent and other thermosetting resin and the balance of a pigment, a filler and other additives if desired.

A composition for prepregs preferably comprises 30 to 60% of the resin of this invention, 0.1 to 10% of a radical initiator and the balance of an organic solvent of 40 to 70% and if desired 1 to 5% of surface treatment agent, 5 to 50% of filler and other additives.

The resin used for the coating material is prepared from "polycarboxyl 1,2-polybutadiene" having an average number molecular weight of 500 to 5,000, favorably 1,000 to 3,000 and preferably more than 80% of 1,2-configuration. The organic peroxide compound, the curing promotor and the other thermosetting resin described in the thermosetting resin composition are all available in the case of the coating material composition. Organic solvents which may be employed for the coating material composition include aliphatic hydrocarbons, e.g. naphtha, kerosene and mineral spirtis; aromatic hydrocarbons, e.g. benzene, toluene, xylene and solvesso; alcohols, e.g. butanol, propanol and methyl isobutyl carbinol; esters, e.g. ethyl acetate and butyl acetate; ketones, e.g. methyl ethyl ketone, methyl isobutyl ketone and cyclohexanone; ethers, e.g. ethyleneglycol ethyl ether and ethyleneglycol butyl ether; and hydrocarbon halogenides, e.g. carbon tetrachloride, trichloroethylene, monochlorobenzene and tetra chloroethylene. Pigments used for this composition include titanium with, zinc oxide, white lead, red lead, chrome yellow, ultramarine, iron blue, red oxide, cobalt oxide, chromium oxide and carbon black.

The coating film obtained from the coating material composition of the present invention is curable at a lower temperature than 120° C. and may be dried even at room temperature when the combination of alkyl peresters as a peroxide compound, with a heavy metal salts of organocarboxylic acid as a promotor is employed.

The resulting dried film has excellent properties, e.g. a sufficient hardness, a high impact resistance, a moderate flexibility, a superior adhesion and a beautiful glossy surface, and is suitable for a surface coating of a vehicular body, an electrical part or a protective coating for a chemical vessel.

A composition for the adhesive of the present invention comprises 20 to 90% of the resin of our invention, 10 to 20% of a vinyl compound, 0.1 to 10% of an organic peroxide compound, 0.001 to 1% of curing promotor, an adequate quantity of filler and solvent if necessary, and is available for bonding of wood metals, glass, rubber and plastics.

The resin used for the adhesives is prepared from the polycarboxylic 1,2-polybutadiene having an average molecular weight of 1,000 to 20,000, favorably 2,000 to 10,000, and an organic peroxide compound, a curing promotor and a filler which are described in the thermosetting resin composition and solvent described in the coating material composition are all applicable to the adhesives.

The resin of this invention has excellent adhesive properties with fillers or reinforcements and products made of the resin have heat resisting properties, water resisting properties and chemical strength and they have also excellent electrical properties, chemical resistance which are traditional properties from 1,2-polybutadiene.

Various kinds of goods can be produced by the resin of our invention, for example, the resin is preferably used by casting or moulding in such electric parts as condenser, cable splicer resistance, transistor, motor, transformer, generator, insulator, switchgear, breaker, socket, plug socket, such chemical apparatus as cock, valve, piping joint, pump, such structural parts of cars and bicycles as casings, distributor caps, brake, clutch and such miscellaneous goods as pallete of container, tableware, title, synthetic marble. Prepregs made of the resin of our invention is tack free and working properties of the prepregs can be improved because the resin can be obtained in the states of solid powder or granule and the resin can be employed in such laminates as electric parts, e.g. insulator of fiber reinforced plastic pipe, board of print circuit, tray for microwave oven, radar dome, parts for microwave, chemical apparatus, e.g. reactor vessel and other miscellaneous, e.g. corrugated fiber reinforced plastic board, pallete of container, bath tub, cover of electrolytic cell.

Then the effects of the present invention will be shown in the following examples. All quantities described in this specification and the appended claims as "parts" or "percent" refer to "parts by weight" or "percent by weight" unless expressly stated otherwise.

EXAMPLE 1

Butadiene was added into tetrahydrofuran containing a dispersed metallic sodium and 1,2-diphenyl benzene at —75° C., and polymerized under vigorous agitation. The reaction mixture was treated with carbondioxide gas and then hydrolyzed, and thus "polycarboxyl 1,2-polybutadiene" (I) having a number average molecular weight, determined by a vapor pressure osmometer, of 1960, acid value of 46.0, 89.9% of 1,2-configuration butadiene units, 10.1% of trans 1,4-configuration units was obtained. On the other hand 210 parts (0.0861 mole) of "polycarboxyl 1,2-polybutadiene" (I) was dissolved into 400 parts of tetrahydrofuran placed in a flask equipped with a reflux condenser and a stirrer. Thereafter 20 parts of water and various kinds of metallic components listed in Table 1 were added into the mixture, and kept for one hour under reflux. After the reaction, polymer was isolated from upper layer by pouring the reaction mixture into 5 liters of water, and the polymer was washed with water and methyl alcohol, and dried at 60° C. under reduced pressure.

The appearance and viscosity (diluted with toluene) of the obtained resin are shown in Table 1.

EXAMPLE 2

Butadiene was added into tetrahydrofuran containing a dispersed metallic sodium and 1,2-diphenyl benzene at —75° C., and polymerized under vigorous agitation. The reaction mixture was treated with ethyleneoxide and then hydrolyzed, and thus "polycarboxyl 1,2-polybutadiene" having a number average molecular weight, determined by a vapor pressure osmometer, of 2880, hydroxyl value of 33.0, 92.2% of 1,2-confiugration units, 7.8% of trans 1,4-configuration units was obtained. On the other hand 200 parts of the 1,2-polybutadiene was dissolved into 400 parts of toluene in a 1 liter flask with reflux condenser and a stirrer. Thereafter 11.5 parts of maleic anhydride were added into the mixture at 50° C. and mixed for 30 minutes. Thereby "polycarboxyl 1,2-polybutadiene" (II) which had carboxyl groups bonding ester groups in the terminals was prepared.

The produced polymer were shown in Table 2.

Then, 20 parts of water and specified amounts of metallic components shown in Table 2 were added into toluene solution of (II), and the reaction was carried out at 80° C. for 2 hours. Resin obtained by the same process as described in Example 1 was an elastic or powdery one.

EXAMPLE 3

Butadiene was added into tetrahydrofuran containing a dispersed metallic sodium and 1,2-diphenyl benzene at —75° C., and polymerized under vigorous agitation. The reaction mixture was treated with epichlorohydrin, and then hydrolyized, and thus epoxy terminated 1,2-polybutadiene having a number average molecular weight, determined by a vapor pressure osmometer, of 1250, 90.2% of 1,2-configuration butadiene units, 9.8% of trans 1,4-configuration units, 2.22% epoxy contents was obtained.

On the other hand, 100 parts of epoxy terminated 1,2-polybutadiene was dissolved into 300 parts of tetrahydrofuran in a flask with reflux condenser and a stirrer. Thereafter, 14 parts of fumaric acid was added. The reaction was carried out under a blanket of nitrogen gas at 60° C. for 2 hours. Then, "polycarboxyl 1,2-polybutadiene" (III) varnish of tetrahydrofuran was obtained.

Further, some parts of metallic components shown in Table 3 were added into the varnish. The resin obtained by the same process as described in Example 1 was elastic or powdery.

EXAMPLE 4

Butadiene was added into tetrahydrofuran containing a dispersed metallic sodium and 1,2-diphenyl benzene at —75° C., and polymerized under vigorous agitation. The reaction mixture was treated with water. Thus 1,2-polybutadiene homopolymer having a number average molecular weight of 4270, 87.5% of 1,2-configuration units, 12.5% of trans 1,4-configuration units was obtained. Then, 100 parts of the 1,2-polybutadiene were dissolved into 400 parts of toluene in a flask with reflux condenser and a stirrer. Thereafter, 90 parts of toluene solution containing 10 parts of methacrylic acid and 0.2 part of benzoyl peroxide was dropped into the said solution at 85° C. This reaction was completed for 2 hours at 85° C. and further for 1 hour at 95° C. After adding 0.1 part of hydroquinone the residual methacrylic acid was removed completely in vacuum. Thus, the "polycarboxyl 1,2-polybutadiene" grafted with methacrylic acid (IV) was obtained. According to the iodine value, acid value and an infrared absorption spectrum analysis, it was expected that "polycarboxyl 1,2-polybutadiene" (IV) was a polymer with 4 mole of methacrylic acid grafted to one polybutadiene molecular.

On the other hand, 100 parts of the "polycarboxyl 1,2-polybutadiene" (IV), 200 parts of acetone and 100 parts of toluene were mixed well. Then 5 parts of water and some parts of metallic components shown in Table 4 were added into the solution. Thereby, the mixture was reacted for 3 hours at reflux temperature of acetone. The resin obtained by the same process as described in Example 1 was elastic or powdery.

EXAMPLE 5

1,2-polybutadiene homopolymer having a number average molecular weight of 1,160, 89.7% of 1,2-configuration butadiene units, 10.3% of trans 1,4-configuration was obtained in accordance with the same process as described in Example 4.

170 parts of the homopolymer was dissolved into 140 parts of O-dichloro benzene, and then 0.3 parts of di-tert-butyl-paracresol as inhibitor, and 65 parts of maleic anhydride were added into the mixture and reacted in inert atmosphere at 170° C. for 2 hours under agitation. After the reaction, residual maleic anhydride and O-dichlorobenzene were removed under reduced pressure. Consequently, 1,2-polybutadiene (V) having 10.5% of adding maleic acid was obtained as pot residue.

On the other hand, butadiene and styrene were added into tetrahydrofuran containing a dispersed metallic sodium and 1,2-diphenyl benzene at —75° C., and polymerized under vigorous agitation. The reaction mixture was treated with water and then 1,2-butadiene copolymer having a number average molecular weight of 2210, 79.4% of butadiene chain units, 20.6% of styrene units, 67.3% of 1,2-configuration units in butadiene chain unit, 22.8% of trans 1,2-configuration 9.9% of cis-1,4-configuration was obtained. Then, maleic anhydride was reacted with the 1,2-butadiene copolymer and "polycarboxyl 1,2-polybutadiene" (VI) having 7.8% of adding maleic acid in molecular was obtained with the same process as above said method.

100 parts of "polycarboxyl 1,2-polybutadiene" (V) or (VI) was dissolved in 300 parts of tetrahydrofuran. Then 10 parts of water and some parts of metallic component shown in Tables 5 and 6 were added in the mixture and reacted at reflux temperature for 10 minutes to 2 hours.

By treating the solution with the same process as described in Example 1, the resin of the invention was obtained.

EXAMPLE 6

Butadiene and methyl methacrylate was added into tetrahydrofuran containing a dispersed metallic sodium and 1,2-diphenyl benzene at −75° C., and polymerized under vigorous agitation. The reaction mixture was treated with water, and thus butadiene copolymer of butadiene-methyl methacrylate copolymer having average molecular weight, determined by a vapor pressure osmometer, of 5600 was obtained. The copolymer consisted of 38% of butadiene units and 17% of methyl methacrylate units. For the butadiene units, it consisted of 72.5% of 1,2-configuration butadiene units, 20.3% of trans 1,4-configuration units, 7.2% of cis 1,4-configuration units.

Then, 100 parts of copolymer and 5 parts of emulsifier (Kao-Atlas Co. Emulgen 913) was mixed. The mixture was first warmed to 40 to 50° C. and changed to latex from paste by slowly adding water while stirring. Then 100 milliliters of 30% sodium hydroxide solution was added, the autoclave was then closed and heated to a temperature of 120° C. for five hours. The latex at 50° C. was then slowly acidified with 3% hydrochloric acid solution to a pH between 1.0 and 1.5 after acidification it is found that the latex has coagulated.

This polymer was washed by hydrochloric acid solution and still more by water until only a trace of chloride can be detected in the final wash water. The polymer was then dried in a circulating air oven at 70° C. Thus the copolymer (VII) which contained carboxyl group was obtained.

The carboxyl content of the obtained copolymer (VII) was determined by dissolving one gram of the copolymer in 100 milliliters of tetrahydrofuran and titrating with

N/10 potassium hydroxide using phenolphthalein as an indicator. The copolymer was found to contain 3.5% carboxyl group.

100 parts of the copolymer (VII) was dissolved in 300 parts of tetrahydrofuran, and which was added metal compounds as shown in Table 7. With the same treatment as shown in Example 1 the polymer which contained metallic bonding was obtained in a state of elastomer or powder.

EXAMPLE 7

100 parts of "polycarboxyl 1,2-polybutadiene" (I) prepared in Example 1 and 5 parts of emulsifying agent, polyoxyethylene nonyl phenol ether type non-ionic surface active agent (Kao-Atlas Co. Emulgen 913) were mixed at 40 to 50° C. Then water was gradually added into the mixture, thereby emulsion was obtained. Some parts of metallic component shown in Table 8 was added into the emulsion. As result, separated polymer was isolated by centrifugal separation. After the washing the separated polymer with water, the polymer was dried at 60° C. under reduced pressure. Obtained resins were shown in Table 8.

As a comparison, the same treatment was carried out for polycarboxyl 1,4-polybutadiene prepared in comparative Example 1 stated later. The obtained resin showed high viscosities in toluene solution and unsuitable properties for preparation of prepreg. The results were listed in Table 8 as a control.

EXAMPLE 8

100 grams of "polycarboxyl 1,2-polybutadiene" (V) obtained in Example 5, 2 grams of water and 0.8 to 2.0 equivalent of metallic components shown in Table 9, which were required to react with one equivalent carboxyl groups in the polymer, were mixed by means of a roller. After 2 to 3 minutes of the adding metallic component the viscosities of the varnish was rapidly increased.

At the end of mixing for 30 minutes, the obtained material was elastic or powdery at room temperature. Viscosity of solution which 10 parts of this polymer was dissolved in 100 volume parts of toluene was shown in Table 9.

EXAMPLE 9

Butadiene was added into tetrahydrofuran containing a dispersed metallic sodium and 1,2-diphenyl benzene at −75° C., and polymerized under vigorous agitation. The reaction mixture was treated with disulfide at low temperture, and then distilled under reduced pressure passing nitrogen gas. Thus, "polycarboxyl 1,2-polybutadiene" (VIII) having a number average molecular weight, determined by a vapor pressure osmometer, of 1,200, acid value of 61, 85.7% of 1,2-configuration butadiene units, 14.3% of trans 1,4-configuration units was obtained. According to the results of an infrared absorption spectrum analysis, the band at 1200 cm.$^{-1}$ ($\lambda_{C=S}$) and 2,580, 2510 cm.$^{-1}$ ($\lambda_{S-H}$) were observed. From this results, it was determined that this material was polybutadiene dicarbodithioic acid.

On the other hand, 100 parts of polybutadiene dicarbodithoic acid (VIII), 300 parts of tetrahydrofuran were mixed well. Then some parts of various metallic components shown in Table 10 were added into the solution, and heated at reflux temperature of tetrahydrofuran for 2 hours. The obtained resin were shown in Table 10.

EXAMPLE 10

100 parts of "polycarboxyl 1,2-polybutadiene" (I) prepared Example 1, 0.1 part of di-tertiary butyl-para-cresol, 3 parts of t-glycido-oxypropyl trimethoxysilan and 4 parts of dicumyl peroxide was mixed and then 400 parts of silica powder (Shiraishi) Calcium Co., Ltd. Cristallite B–1) was added at 80° C. and well kneaded. Still more, 50 parts of silica and metallic compound of 1,2 equivalent more required to react carboxyl groups in the polymer were added and mixed at temperatures of 100 to 120° C. The mixture increased gradually the viscosity from the premix and became so tough as to be impossible mixing. After the dough cooled in a room temperature, the solidifing dough was ground by means of ball mill and moulding compounds in a states of powder to granule were obtained. The moulding compounds were cured at 160° C. for 10 minutes under the pressure of 15 to 20 kg./cm.$^2$. The moulding obtained showed excellent chemical strength and electric property even after thetr teatment of boiling water as shown in Table 11.

As a comparison, the same treatment was repeated for polycarboxyl 1,4-polybutadiene (XI) prepared in comparative Example 1 stated later and obtained compounds in a state of powder. The compounds did not show enough fluidity at 160° C. under the pressure of 15 to 20 kg./cm.$^2$ and were not cured sufficiently for 10 minutes. So, the compounds were moulded at 160° C. for 20 minutes under the pressure of 35 kg./cm.$^2$. The obtained mouldings showed lower hardness and flexural strength, and lower volume resistivity than the mouldings from this invention.

EXAMPLE 11

Butadiene was added into tetrahydrofuran containing dispersed metallic sodium and 1,2-diphenyl benzene at −75° C., and polymerized under vigorous agitation. The reaction mixture was treated with ethyleneoxide and then hydrolyzed, and the 1,2-polybutadiene diol having a number average molecular weight of 1980, hydroxyl value of 48.0, 91.5% of 1,2-configuration butadiene units, 8.5% of trans 1,4-configuration units was obtained.

100 parts of the 1,2-polybutadiene diol and 12.3 parts of phthalic anhydride was heated at the temperature of 100° C. At the same temperature, the mixture was treated for two hours under vigorous agitation, and 112 parts of "polycarboxyl 1,2-butadiene" (IX) which had carboxyl groups bonding ester group in the terminals was produced.

100 parts of the "polycarboxyl 1,2-butadiene" (IX) 0.1 parts of di-tertiary-butyl-para-cresol, 3 parts of γ methacryloxy propyltrimethoxysilan, 2 parts of dicumyl peroxide and 1 part of tertiary-butyl perbenzoate was mixed and then was added 200 parts of silica Shiraishi Calcium Co. crystallite B–1) 100 parts of clay (Shiraishi Calcium Co. Burgess Pigment No. 30) and 4 parts of zinc stearate at the temperature 60° C. After the mixture was well kneaded, 30 parts of chopped glass fiber with 3 mm. in length was added. Beside the mixture was kneaded for ten minutes, and then was added 30 parts of silica and metal compounds of 1.5 times of equivalent mole required to react carboxyl groups in the above polymer (IX). The material was mixed sufficiently on the roll mill and was formed a sheet from 5 to 8 millimeter thickness.

After the sheet was kept for one day at room temperature that was ground by means of mill into moulding compounds in a state of powder to granule. The molding compounds were cured at 160° C. for 5 minutes under the pressure of 15 to 20 kg./cm.$^2$. The obtained mouldings had excellent characterizations as shown in Table 12.

EXAMPLE 12

100 parts of polycarboxyl 1,2-polybutadiene (II) described in Example 2 was dissolved in 200 parts of toluene. Then 5 parts of water and 5.1 parts of $Mg(CH_3CO_2)_2 \cdot 4H_2O$) were added. The mixture was agitated for 2 hours at 80° C. and then cooled to a room temperature. Next 5 parts of dicumyl peroxide and 1 part of γ-methacryloxy-propyltrimethoxysilane were dissolved into the mixture. Glass fiber cloth (Asahi Fiber Glass Co. Glasron Cloth SLS–213A) was submerged into the varnish and prepreg resin content was controlled with squeeze bars. After the impregnated material was dried for 10 minutes at 120° C., tack free prepreg was obtained. Also polycarboxyl 1,2-polybutadiene (I and V) prepared by the method of Examples 1 and 5 were utilized in the same way as described above, and tack free prepregs were obtained. Each prepreg had excellent handling properties due to its good elasticities and tack-free.

Control prepregs were prepared by the same procedure using comparative example resin (XI) and (XII). However, the viscosity of varnish from example resin (XII) was so high that the varnish was diluted with 200 parts of toluene. Therefore, it required three times of impregnation to obtain prepregs having 30% of resin content.

The prepregs were stacked to 12 plies and laminate was obtained by curing at 170° C. for 5–20 minutes under the pressure of 15 kg./cm.$^2$. From the Table 13, it would be clear that the laminate of the present invention has superior mechanical properties, electrical properties and curing velocity compared with laminates of conventional polycarboxyl polybutadiene.

EXAMPLE 13

Polycarboxyl 1,2-polybutadiene (X) having a number average weight of 1490. 62.0 of acid value 90.2% of 1,2-configuration units, 9.8% of trans 1,4-configuration units, was obtained in accordance with the same process as described in Example 1. Then, 100 parts of the polycarboxy 1,2-polybutadiene (X) and 10 parts of styrene were well mixed, and then 0.1 part of di-tert-butyl-paracresol, 2 parts of γ-glycideoxy propyl trimethoxysilane and 3 parts of dicumyl peroxide were added into the mixture, thereafter 100 parts of calcium carbonate (Shiraishi Calcium Co. Whiton SB Red) was well mixed into the above resin. Furthermore equivalent mole of metallic compound which was required to reaction with carboxyl in the above polymer (X) and 5 parts of styrene were well ground, thus a paste was obtained. Then the above resin and a paste were mixed under vigorous agitation for 3–5 minutes, 72 parts of reaction mixture was impregnated into chopped strand mat (Asahi Fiber Glass Co. CM 405 F) of 30 cm. x 30 cm., and then impregnated sheet material was warmed at 80° C. for 20 minutes. Obtained sheet molding compound was tack free.

The sheet was stacked to 4 plies and laminate was obtained by curing at 160° C. for 10 minutes under the pressure of 10–20 kg./cm.$^2$. As shown in the Table 14, the laminate have excellent flexural strength and electrical properties.

As comparison, the same treatment was repeated for polycarboxyl 1,4-polybutadiene (XI) obtain in comparative Example 1. The prepreg did not show sufficient fluidity and could not be sufficiently cured at 160° C. for 10 minutes and the properties of laminates obtained by curing at 160° C. for 20 minutes under 30–50 kg./cm.$^2$ was listed in Table 14 as a control.

EXAMPLE 14

Coating compositions of clear varnish were prepared by mixing 65 parts of "polycarboxyl 1,2-polybutadiene" (I) and (IV) respectively with cobalt naphthenate corresponding to 0.02 phr of cobalt, and 35 parts of vinyl monomer or solvent as shown Table 15. Also control compositions were prepared by the same procedure using comparative example resin (XI). These clear varnishes were respectively coated on each polished steel plate with a doctor blade and coated plate was baked. Testing results of the film are presented in Table 15.

From Table 15, it would be clear that the coating composition of the present invention, has superior flexibility, DuPont impact and can be cured very fast.

EXAMPLE 15

Adhesive compositions were prepared by mixing 80 parts of "polycarboxyl 1,2-polybutadiene" (I) and (2) with 20 parts of vinyl monomer and 2 phr of initia for homogeneously.

Control compositions were prepared by the same procedure using comparative example resin (XI).

The adhesive composition was coated on 2 plies of polished steel plates, which were sticked each other under pressure and backed. Tensile shear strength of the adhered plate was determined in accordance with ASTM D 1002, which are shown in Table 16.

From Table 16, it would be clear that the adhesive composition of the present invention has superior adhesion compared with conventional polycarboxyl polybutadiene.

EXAMPLE 16

Example 1 was repeated except that the reaction mixture was treated with carbonyl sulfide.

Thus polycarboxyl 1,2-polybutadiene having thio carboxyl groups and thermosetting resin having metallo-thiocarboxylate were obtained.

EXAMPLE 17

Example 1 was repeated except that the reaction mixture was treated with carbondioxide and carbon disulfide. Thus "polycarboxyl 1,2-polybutadiene" having carboxylic group and dithio carboxylic groups, and the thermosetting resin having metallo-carboxylate group and metallo-dithiocarboxylate groups were obtained.

COMPARATIVE EXAMPLE 1

Butadiene was introduced into n-hexane containing lithiumbutylsto and diethylether at room temperature to polymerize under vigorous agitation. The reaction mixture was then treated with carbon dioxide, and polycarboxyl polybutadiene (XI) having a number average molecular weight of 2820 (32.6 of acid value, 24.6% of 1,2-configuration units, 48.3% of trans 1,4-configuration units and cis-1,4 configurations units was obtained.

COMPARATIVE EXAMPLE 2

A butadiene-methacrylic acid compolymer was prepared using potassium persulfate and a small amount of ferric sulfate as the catalyst, metallic salt of aliphatic acid as the emulsifier, and dodecyl mercaptan as the modifier. The reaction was carried out at 55° C. under environment of nitrogen, and coagulation of the latex was effected by sodium chloride.

Fractionation of the polymer was performed using toluene-methanol, and thus butadiene-methacrylic acid copolymer (XII) having a number average molecular weight of 5100, acid value of 35.2, 94.0% of butadiene unit and 6.0% of methacrylic acid unit on the polymeric chain, 26.3% of 1,2-configuration units, 65.5% of trans-1,4-configuration units, 8.2% of cis-1,4-configuration units, was obtained.

These polymers obtained by Comparative Example 1 and 2 were used for molding compounds, laminates, adhesive and coating materials.

As shown in the results of Examples 1–15, it would be clear that the molding compounds, laminates, adhesives and coatings based on the present invention can be prepared in shorter period of time with an excellent workability and have improved mechanical and electrical properties.

TABLE 1

| Run: | Polycarboxyl 1,2-polybutadiene | Metallic compounds | Metal/CXYH ratio [1] | Appearance | Viscosity in cps. (at 20° C.) [2] |
|---|---|---|---|---|---|
| 1 | I | | | Viscous, oily | 3.5 |
| 2 | I | NaOH | 1 | Powder | 155 |
| 3 | I | NaOCH₃ | 1 | do | 130 |
| 4 | I | CaO | 0.75 | Elastomer | 258 |
| 5 | I | Ca(OH)₂ | 1 | Powder | 380 |
| 6 | I | MgO | 0.5 | do | 700 |
| 7 | I | MgO | 1 | do | 2,600 |
| 8 | I | Al(CH₃CO₂)₃ | 0.75 | do | 2,050 |
| C-1 [3] | XI | | | Viscous, oily | 4.0 |
| C-2 | XI | Ca(OH)₂ | 1 | Powder | 1,050 |
| C-3 | XI | MgO | 0.7 | do | 3,200 |
| C-4 | XI | NaOH | 1 | do | 410 |

[1] Mole number of metal component used/mole number of (CXYH) belonging to polycarboxyl 1,2-polybutadiene.
[2] Polymer, 10 gr. dissolved in toluene, 100 ml. (centipoise).
[3] C- for control.

TABLE 2

| Run: | Polycarboxyl 1,2-polybutadiene | Metallic compounds | Metal/CXYH ratio [1] | Appearance | Viscosity in cps.[2] |
|---|---|---|---|---|---|
| 9 | II | | | Viscous, oily | 4 |
| 10 | II | Mg | 1 | Powder | 2,760 |
| 11 | II | MgO | 0.7 | do | 1,500 |
| 12 | II | MgO / ZnO | 0.5 / 0.25 | do | 1,250 |
| 13 | II | ZnO | 1 | do | 880 |
| 14 | II | ZnCl₂ | 1 | do | 640 |
| 15 | II | Ca(OH)₂ | 1 | do | 500 |

[1,2] See Table 1, footnotes 1 and 2.

TABLE 3

| Run: | Polycarboxyl 1,2-polybutadiene | Metallic compounds | Metal/CXYH ratio [1] | Appearance | Viscosity in cps.[2] |
|---|---|---|---|---|---|
| 16 | III | | | Viscous, oily | 2.0 |
| 17 | III | BaO | 1 | Powder | 1,230 |
| 18 | III | MgO | 0.7 | do | 1,500 |
| 19 | III | MgO / CaO | 0.5 / 0.5 | do | 1,100 |
| 20 | III | Ca(OH)₂ | 1 | do | 850 |
| 21 | III | ZnO | 1 | do | 600 |

[1,2] See Table 1, footnotes 1 and 2.

TABLE 4

| Run: | Polycarboxyl 1,2-polybutadiene | Metallic compounds | Metal/CXYH ratio [1] | Appearance | Viscosity in cps.[3] |
|---|---|---|---|---|---|
| 22 | IV | | | Viscous, oily | 6.5 |
| 23 | IV | KOH | | Powder | 320 |
| 24 | IV | MgO | | do | 3,270 |
| 25 | IV | MgO / Ca(OH)₂ | 0.5 / 0.2 | do | 1,500 |
| 26 | IV | CaO / Ca(OH)₂ | 0.5 / 0.3 | do | 620 |
| 27 | IV | CaO | 0.7 | do | 470 |
| 28 | IV | Zn(CH₃CO₂)₂ | 1 | do | 680 |
| C-5 [3] | XII | | | Viscous, oily | 8.0 |
| C-6 | XII | Mg(OH)₂ | 0.5 | Elastomer | 1,550 |
| C-7 | XII | MgO | 0.7 | Powder | 5,700 |
| C-8 | XII | Zn(CH₃CO₂)₂ | 1 | Elastomer | 2,940 |

[1,2,3] Table 1, footnotes 1, 2 and 3.

TABLE 5

| Run | Polycarboxyl 1,2-polybutadiene | Metallic compounds | Metal/CXYH ratio[1] | Appearance | Viscosity in cps.[2] |
|---|---|---|---|---|---|
| 29 | V | | | Viscous, oily | 2.0 |
| 30 | V | $K_2CO_3$ | 1 | Powder | 210 |
| 31 | V | $Mg(OH)_2$ | 1 | do | 2,230 |
| 32 | V | $ZnCl_2$ | 1 | Elastomer | 390 |
| 33 | V | CaO | 1 | Powder | 820 |

[1,2] See Table 1, footnotes 1 and 2.

TABLE 6

| Run | Polycarboxyl 1,2-polybutadiene | Metallic compounds | Metal/CXYH ratio[1] | Appearance | Viscosity in cps.[2] |
|---|---|---|---|---|---|
| 34 | VI | | | Viscous, oily | 3.5 |
| 35 | VI | $NaHCO_3$ | 1 | Powder | 450 |
| 36 | VI | $Mg(OH)_2$ | 1 | do | 2,580 |
| 37 | VI | CaO | 1 | do | 1,300 |

[1,2] See Table 1, footnotes 1 and 2.

TABLE 7

| Run | Polycarboxyl 1,2-polybutadiene | Metallic compounds | Metal/CXYH ratio[1] | Appearance | Viscosity in cps.[2] |
|---|---|---|---|---|---|
| 38 | VII | | | Viscous, oily | 8 |
| 39 | VII | MgO | 0.5 | Powder | 3,100 |
| 40 | VII | SrO | 0.7 | do | 2,450 |
| 41 | VII | $Ca(OH)_2$ | 1 | do | 3,300 |

[1,2] See Table 1, footnotes 1 and 2.

TABLE 8

| Run | Polycarboxyl 1,2-polybutadiene | Metallic compounds | Metal/CXYH ratio[1] | Appearance | Viscosity in cps.[2] |
|---|---|---|---|---|---|
| 42 | I | | | Viscous oily | 3.5 |
| 43 | I | NaOH | 1 | Powder | 310 |
| 44 | I | MgO | 0.75 | do | 1,800 |
| 45 | I | $Mg(CH_3CO_2)_2$ | 1 | do | 2,200 |
| 46 | I | {MgO / $Ca(OH)_2$} | {0.5 / 0.2} | do | 1,350 |
| C-9[3] | XI | | | Viscous, oily | 4.0 |
| C-10 | XI | MgO | 1 | Powder | 3,850 |
| C-11 | XI | $Mg(CH_3CO_2)_2$ | 1 | do | 3,740 |
| C-12 | XI | NaOH | 1 | do | 820 |

[1,2,3] See Table 1, footnotes 1, 2, and 3.

TABLE 9

| Run | Polycarboxyl 1,2-polybutadiene | Metallic compounds | Metal/CXYH ratio[1] | Appearance | Viscosity in cps.[2] |
|---|---|---|---|---|---|
| 47 | V | | | Viscous liquid | 2.0 |
| 48 | V | $Mg(OH)_2$ | 1 | Powder | 1,980 |
| 49 | V | Zn | 1 | Elastomer | 190 |
| 50 | V | CaO | 1 | Powder | 700 |

[1,2] See Table 1, footnotes 1 and 2.

TABLE 10

| Run | Polycarboxyl 1,2-polybutadiene | Metallic compounds | Metal/CXYH ratio[1] | Appearance | Viscosity in cps.[2] |
|---|---|---|---|---|---|
| 51 | VIII | | | Viscous liquid | 2.0 |
| 52 | VIII | $Zn(CH_3CO_2)_2$ | 1 | Powder | 300 |
| 53 | VIII | NaOH | 0.7 | Elastomer | 180 |

[1,2] See Table 1, footnotes 1 and 2.

TABLE 11

| | Run | | | | | |
|---|---|---|---|---|---|---|
| | 54 | 55 | 56 | C-13 | C-14 | |
| Polycarboxyl 1,2-polybutadiene | I | I | I | XI | XI | I. |
| Metallic compounds | $Mg(OH)_2$ | MgO | MgO, ZnO | $Mg(OH)_2$ | MgO | MgO. |
| Appearance of molding compounds | Powder | Powder | Granule | Powder | Powder | Dough. |
| Molding conditions | 160° C. x 20 kg./cm.² x 10 min. | 160° C. x 20 kg./cm.² x 10 min. | 160° C. x 10 kg./cm.² x 10 min. | 160° C. x 35 kg./cm.² x 20 min. | 160° C. x 35 kg./cm.² x 20 min. | 160° C. x 10 kg./cm. x 30 min. |
| Testing result: | | | | | | |
| Barcol hardness | 73 | 75 | 72 | 58 | 62 | 65. |
| Flexural strength kg./mm.² | 9.6 | 10.5 | 9.2 | 5.9 | 7.1 | 6.9. |
| Flexural strength (kg./mm.²) after 2 hrs. in boiling water | 9.4 | 10.5 | 9.0 | 5.0 | 6.4 | 6.0. |
| Volume resistivity ($\Omega$cm.) | $3\times10^{16}$ | $7\times10^{15}$ | $1\times10^{14}$ | $1.5\times10^{14}$ | $2\times10^{14}$ | $2\times10^{16}$. |
| Volume resistivity ($\Omega$cm.) after 2 hrs. in boiling water | $7\times10^{15}$ | $9\times10^{15}$ | $1\times10^{15}$ | $8\times10^{12}$ | $1\times10^{13}$ | $5\times10^{15}$. |

TABLE 12

| | Run | | | | |
|---|---|---|---|---|---|
| | 57 | 58 | 59 | C-15 | |
| Polycarboxyl 1,2-polybutadiene | IX | IX | IX | XI | IX. |
| Metallic compounds | MgO | MgO, ZnO | CaO | MgO, ZnO | |
| Appearance of molding compounds | Powder | Powder | Powder | Powder | Dough. |
| Molding conditions | 160° C. x 15 kg./cm.² x 5 min. | 160° C. x 10 kg./cm.² x 5 min. | 160° C. x 20 kg./cm.² x 5 min. | 160° C. x 30 kg./cm.² x 20 min. | 160° C. x 10 kg./cm.² x 20 min. |
| Testing result: | | | | | |
| Barcol hardness | 75 | 75 | 75 | 63 | 62. |
| Flexural strength (kg./mm.²) | 11.4 | 11.7 | 10.7 | 8.0 | 8.2. |
| Flexural strength (kg./mm.²) after 2 hrs. in boiling water | 11.0 | 11.2 | 10.3 | 6.9 | 7.4. |
| Volume resistivity ($\Omega$cm.) | $2\times10^{16}$ | $1\times10^{16}$ | $1\times10^{16}$ | $5\times10^{14}$ | $8\times10^{16}$. |
| Volume resistivity ($\Omega$cm.) after 2 hrs. in boiling water | $5\times10^{15}$ | $2\times10^{15}$ | $2\times10^{15}$ | $1\times10^{13}$ | $1\times10^{15}$. |

TABLE 13

| | Run | | | | | |
|---|---|---|---|---|---|---|
| | 60 | 61 | 62 | C-16 | C-17 | |
| Polycarboxyl 1,2-polybutadiene | I | II | V | XI | XII | I | II. |
| Metallic compounds | $Mg(CH_3CO_2)_2$ | $Mg(CH_3CO_2)_2$ | $Mg(CH_3CO_2)_2$ | $Mg(CH_3CO_2)_2$ | $Mg(CH_3CO_2)_2$ | | |
| Appearance of prepreg | Tack free | Tack free | Tack free | Slightly tacky | Tack free | Tacky | Tacky. |
| Molding conditions | 170° C. x 15 kg./cm.² x 7 min. | 170° C. x 15 kg./cm.² x 5 min. | 170° C. x 15 kg./cm.² x 10 min. | 170° C. x 15 kg./cm.² x 20 min. | 170° C. x 15 kg./cm.² x 15 min. | 170° x 10 kg./cm. x 20 min. | 170° x 10 kg./cm. x 15 min. |
| Testing result: | | | | | | | |
| Resin content (percent) | 30 | 28 | 28 | 27 | 28 | 28 | 27. |
| Barcol hardness | 63 | 65 | 65 | 58 | 56 | 56 | 60. |
| Flexural strength (kg./mm.²) | 41 | 43 | 38 | 30 | 33 | 32 | 34. |
| Flexural strength (kg./mm.²) after 2 hrs. in boiling water | 38.5 | 40 | 36 | 26 | 28 | 28 | 31. |
| Volume resistivity ($\Omega$ cm.) | $1\times10^{16}$ | $5\times10^{15}$ | $8\times10^{15}$ | $7\times10^{14}$ | $3\times10^{14}$ | $2\times10^{15}$ | $9\times10^{14}$. |

TABLE 14

| | Run | | | | | |
|---|---|---|---|---|---|---|
| | 63 | 64 | 65 | C-18 | C-19 | |
| Polycarboxyl 1,2-polybutadiene | X | X | X | XI | XI | X. |
| Metallic compounds | MgO | MgO, ZnO | CaO | MgO | MgO, ZnO | |
| Appearance of sheet molding compounds | Tack free | Tack free | Tack free | Tack free | Tack free | Tacky. |
| Molding conditions | 160° C. x 20 kg./cm.² x 10 min. | 160° C. x 10 kg./cm.² x 10 min. | 160° C. x 20 kg./cm.² x 10 min. | 160° C. x 50 kg./cm.² x 20 min. | 160° C. x 30 kg./cm.² x 20 min. | 160° C. x 15 kg./cm.² x 30 min. |
| Testing result: | | | | | | |
| Resin content | 30 | 29 | 29 | 31 | 29 | 28. |
| Barcol hardness | 58 | 55 | 53 | 50 | 48 | 48. |
| Flexural strenght (kg./mm.²) | 17 | 15 | 15 | 15 | 10 | 10. |
| Volume resistivity ($\Omega$cm.) | $3\times10^{15}$ | $1\times10^{15}$ | $3\times10^{15}$ | $7\times10^{14}$ | $2\times10^{14}$ | $3\times10^{15}$ |

TABLE 15

| | Run | | | | | | | |
|---|---|---|---|---|---|---|---|---|
| | 66 | 67 | 68 | 69 | 70 | C-20 | C-21 | C-22 |
| Polycarboxyl 1,2-polybutadiene | I | I | I | IV | IV | XI | XI | XII. |
| Metallic compounds | $Ca(OH)$ | MgO | ZnO | $Mg(OH)_2$ | $Zn(CH_3CO_2)_2$ | MgO | $Zn(CH_3CO_2)_2$ | $Mg(OH)_2$. |
| Diluent | t-Butyl styrene | Toluene | Toluene | (¹) | (¹) | (¹) | (¹) | (¹). |
| Initiator | t-Butyl perbenzoate, 2 phr.² | | Dicumyl peroxide, 2 phr. | di-t-Butyl peroxide, 2 phr. | | t-Butyl peroxide, 2 phr. | | |
| Promoter (Co-naph. as Co percent) | 0.02 | 0.02 | 0.02 | 0.02 | 0.02 | 0.02 | 0.02 | 0.02. |
| Film thickness | 20 | 20 | 20 | 20 | 20 | 20 | 20 | 20. |
| Curing conditions (° C.) x (min.) | 130 x 20 | 100 x 30 | 130 x 30 | 130 x 30 | 100 x 20 | 130 x 60 | 140 x 30 | 140 x 30. |
| Testing result: | | | | | | | | |
| Pencil hardness | 4H | 2H | 3H | 4H | 3H | 2H | F | F. |
| Flexibility, 2 mm. | Pass | Pass | Pass | Pass | Pass | Not pass | Not pass | Not pass. |
| Du Pont impact: | | | | | | | | |
| Forward (cm.) | 50 | 50 | 50 | 40 | 50 | 30 | 20 | 30. |
| Reverse | 40 | 50 | 50 | 30 | 50 | 10 | 10 | 10. |

¹ $\frac{\text{Toluene}}{\text{Butanol}} = 4$.

² Parts per hundred resin.

Test method.—Pencil hardness (JIS K 5651) hardest pencil that will not cut film; flexibility (JIS K 5400) diameter of mandrel over which film can be bent through 180° without cracking; Du Pont impact (cm.) ½″, 500 g.

TABLE 16

| | Run | | | | | |
|---|---|---|---|---|---|---|
| | 71 | 72 | 73 | 74 | C-23 | C-24 |
| Polycarboxyl 1,2-polybutadiene | I | I | II | II | XI | XI |
| Metallic compound | CaO | MgO | MgO | ZnO | CaO | MgO |
| Vinyl monomer | Styrene | t-Butyl styrene | Styrene | n-Butyl | Styrene | t-Butyl styrene |
| Initiator | Dicumyl peroxide, 2 phr.[1] | t-Butyl perbenzoate, 2 phr. | Dicumyl peroxide, 2 phr. | t-Butyl perbenzoate, 2 phr. | Dicumyl peroxide, 2 phr. | t-Butyl perbenzoate, 2 phr. |
| Curing condition (° C.) x (min.) | 150 x 60 | 150 x 60 | 150 x 60 | 140 x 60 | 150 x 60 | 140 x 60 |
| Testing result: Tensile shear strength (kg./cm.²): | | | | | | |
| Initial | 113 | 121 | 117 | 110 | 80 | 77 |
| After aging for 30 hrs. at 180° C. | 100 | 109 | 110 | 95 | 63 | 51 |

[1] Parts per hundred resin.

Test method.—Tensile shear strength ASTM D 1002.

We claim:

1. A polycarboxyl polybutadiene resin substance having metallo-carboxylate, metallo-thiocarboxylate, or metallo-dithiocarboxylate cross-linkages useful for making printed circuit boards and other electrical products which are solid, non-tacky, having good hardness characteristics, high impact resistance, good adhesion characteristics and curable at low temperatures in short periods of time, said substance comprising: as butadiene component of the molecular chains, polybutadiene or butadiene copolymer where there is 50% or more butadiene chain units of 1,2-configuration, and, as carboxylate, thiocarboxylate or dithiocarboxylate components of the molecular chains, material selected from the group consisting of CXYH and $$CXY\frac{Me}{2}$$

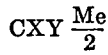

where X and Y are oxygen or sulfur and Me is a metal selected from the group consisting of calcium, magnesium and zinc, 2 being the valence number of the metal, the weight of the polybutadiene or butadiene copolymer being more than 70% of the weight of non-metallic portion of said resin and the total weight of the CXY group is 0.1% to 30% of the non-metallic portion of said resin at least 30% of the total of CXY being in the form of $$CXY\frac{Me}{2}$$

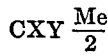

2. A process for the production of the resin substance defined in claim 1 which comprises mixing A and B, wherein A is a polymer having parts of polybutadiene or butadiene copolymer having 50% or more of 1,2-configuration and CXYH groups wherein X and Y are oxygen or sulfur and the total weight of CXY groups is 0.1% to 30% of A; and B is a metal, metal hydroxide, metal oxide, metal alcoholate or metal salt wherein the metal is selected from a group consisting of calcium, magnesium and zinc.

3. A thermosetting resin according to claim 1 wherein both X and Y are oxygen.

4. A composition for a thermosetting resin which comprises 20 to 98% of the resin defined in claim 1 and 0.5–10% of a radical initiator compound.

5. A composition for a thermosetting resin which comprises 20 to 98% of the resin defined in claim 1, 0.5–10% of an organic peroxide compound and 0 to 70% of vinyl monomer.

6. A composition for moldings which comprises 20 to 98% of the resin defined in claim 1, 0 to 70% of vinyl monomer, 0.1 to 10% of radical initiator, 0.001 to 1% of curing promoter and balance of materials selected from the group of other kind of thermosetting resin, filler, reinforcement.

7. The resin of claim 1 wherein the total weight of CXY groups is from 1 to 15% of the weight of the non-metallic portion of said resin.

8. The process of claim 2 wherein the total weight of CXY groups is from 1 to 15% of the weight of the non-metallic portion of said resin.

References Cited

UNITED STATES PATENTS

| | | | |
|---|---|---|---|
| 3,257,346 | 6/1966 | Gruver et al. | 260—94.7 AUX |
| 3,258,448 | 6/1966 | Hallenbeck et al. | 260—94.7 AX |
| 3,267,083 | 8/1966 | Imhof | 260—94.7 AX |
| 3,488,332 | 1/1970 | Hiraoka et al. | 260—94.2 MX |
| 3,598,793 | 8/1971 | Koch | 260—94.7 AX |
| 3,635,891 | 1/1972 | Lubowitz et al. | 260—94.7 AX |
| 3,687,913 | 8/1972 | Hoshino et al. | 260—94.3 MX |

JOSEPH L. SCHOFER, Primary Examiner

W. F. HAMROCK, Assistant Examiner

U.S. Cl. X.R.

260—82.1, 83.3, 85.1, 94.7 AS, 79.5 NV, 79.5 C, 79